Dec. 27, 1949     A. H. BARASCH     2,492,832
ICE CREAM CONTAINER
Filed Aug. 2, 1948
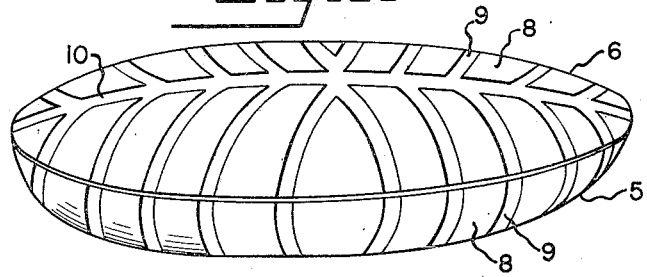
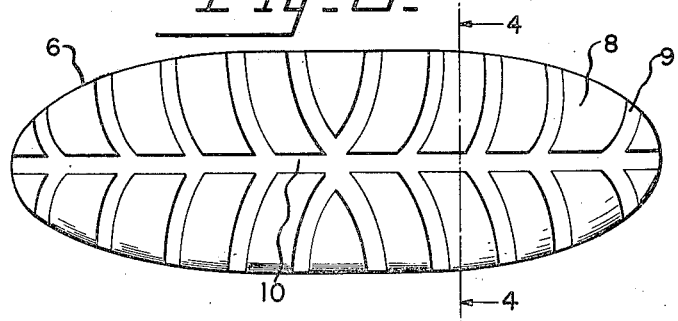
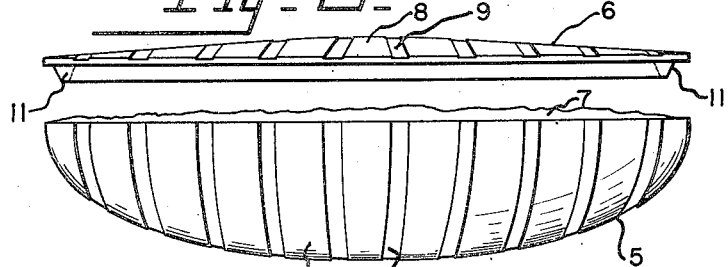
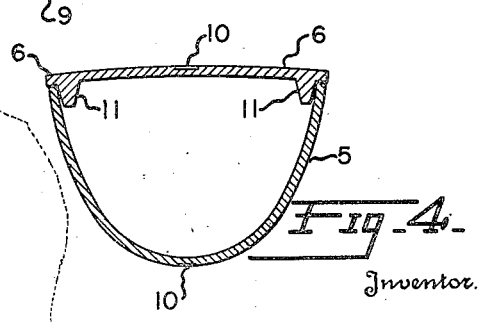
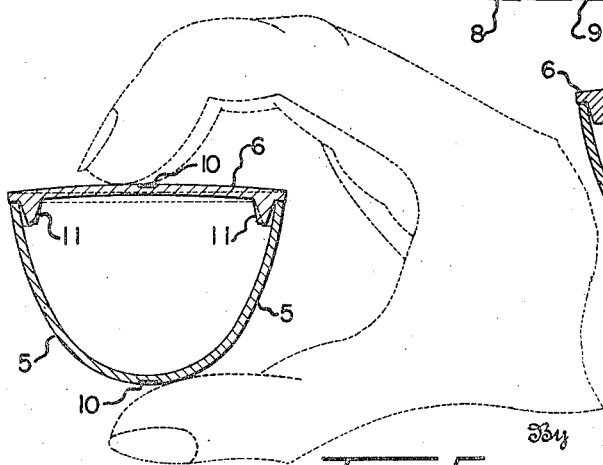
Inventor.
ALLAN H. BARASCH.
By Harvey O'Connell
Attorneys.

Patented Dec. 27, 1949

2,492,832

UNITED STATES PATENT OFFICE 2,492,832

ICE-CREAM CONTAINER

Allan H. Barasch, Uniontown, Pa.

Application August 2, 1948, Serial No. 42,096

5 Claims. (Cl. 99—137)

This invention relates to a food product, and has particular reference to an edible lid-equipped container adapted to receive a filler of ice cream or a chocolate or other flavored filling and ice cream.

An object of the present invention is to provide an edible container of the character mentioned, of such a construction, combination and arrangement of parts that the seal between the container and its lid becomes more effective as consumption of the product progresses to thereby effectively prevent the sticky and dissoluble contents of the container leaking therefrom.

The edible container of the present invention is characterized by a lid that is upwardly arched along the longitudinal axis of the container and is expansible in response to pressure for maintaining a constant seal at the joint between the container and lid.

The invention, together with its objects and advantages, will be best understood when the following detailed description is read with reference to the accompanying drawing, wherein is illustrated a presently preferred embodiment of the invention, and in which:

Figure 1 is a perspective view of a food product embodying the features of the present invention;

Figure 2 is a top plan view thereof;

Figure 3 is a side elevational view showing the container and lid separated, and with the filler exposed;

Figure 4 is a transverse sectional view taken substantially on the line 4—4 of Figure 2, and Figure 5 is a transverse sectional view illustrating the expansible action of the lid when the food product is being held in the hand.

In detail, the food product of my invention comprises a container 5 and a lid 6 therefor, each made of an edible material and preferably from such material as is now employed in the making of ice cream cones.

The container 5 has packed into it a filler 7 of some suitable foodstuff, preferably cold, and more particularly ice cream or a filling of chocolate or any other desired flavor and ice cream, as may be found desirable.

The container 5 and the lid 6 is each preferably formed with alternating substantially transversely extending ridges 8 and grooves 9 bisected by a continuous longitudinal groove 10 extending from one end to the other of the container and lid, respectively. In addition to giving the finished product an ornamental and pleasing appearance, the ridges 8 and grooves 9 and 10 give to the container 5 and lid 6, respectively, such strength and ductility that pressure may be applied thereto, in the manner contemplated by this invention for forming and maintaining a constant seal between the container 5 and the lid 6, and as hereinafter described more fully.

As clearly shown in Figures 3 to 5, inclusive, the lid 6 is substantially concavo-convex in cross section, being upwardly arched along the longitudinal axis. Also on its under or concave side, the lid 6 is formed with an integral continuous flange or tongue 11 that is formed thereon slightly inwardly from the marginal edge of the lid, and is tapered or wedge-shaped in cross section.

After the filler 7 has been placed in the container 5, the lid 6 is then positioned on the container. When in position on the container 5, the lid 6 has the flange or tongue 11 thereof fitted within the confines of the container 5 with the marginal edge of the lid 6 resting on the edge of the wall of container 5 as shown in Figure 4. In so applying the lid, the flange or tongue 11 is forced into the contents 7 so that the proximate portion of the contents aids in enhancing the effectiveness of the seal between the lid and container.

It will be understood that the container 5, together with its lid 6, may be sold over the counter to be filled by the purchaser, or the container with the filler 7 can be sold over the counter for immediate or later consumption.

As clearly shown in Figure 5, when the food product of this invention, comprising the container 5, the filler 7 and the lid 6, is being consumed, it is held in the hand substantially as shown in Figure 5. When so held, pressure is applied by the fingers to the lid 6 to cause the latter to expand laterally thereby forcing the flange or tongue 11 of the lid into positive intimate contact with the interior surface of the container 5 at the rim of the latter to thereby effect a positive joint between the container 5 and its lid 6 for positively preventing the melting filler 7 from exuding between the edge of the wall of the container 5 and the overlying marginal edge portion of the lid 6. Thus in this manner the outside surface of the container and its lid will not become sticky and the container, together with its lid, will remain crisp until they have been entirely consumed.

It will thus be seen that I have provided a food product, and more particularly, a multiple part edible container for ice cream which in addition to being attractive in appearance, possesses strength coupled with such flexibility as permits the parts thereof to respond to a reasonable amount of pressure for maintaining a constant seal at the joint between such parts as will prevent escape of the filler contents at the joint while the product is being eaten.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claims.

What I claim is:

1. A food product comprising an edible food container having a lid upwardly arched along the longitudinal axis thereof and expansible in response to pressure for maintaining a constant seal at the joint between the container and lid.

2. A food product comprising an edible food container, a lid for said container, said lid having a marginal flange adapted to fit within the confines of said container, and said lid being concavo-convex in cross section and expansible in response to pressure for urging said flange into intimate contact with the seal of the container to provide a leak-proof joint therebetween.

3. An edible ice cream holder comprising a container, a lid having frictional contact with the container, said lid being expansible in all directions in response to pressure applied thereto for maintaining constant frictional contact with the container.

4. An edible food container, an edible lid therefor, said lid having on the underside thereof a continuous flange spaced inwardly from the marginal edge of the lid and adapted to fit snugly within the confines of said container.

5. An edible food container, an edible lid therefor, said lid being upwardly arched along the longitudinal axis thereof and having a depending marginal flange adapted to fit within the confines of said container.

ALLAN H. BARASCH.

REFERENCES CITED

The following references are of record in the file of this patent:

UNITED STATES PATENTS

| Number | Name | Date |
|---|---|---|
| 1,445,187 | Vaughan | Feb. 13, 1923 |
| 1,524,367 | Papageorge | Jan. 27, 1925 |
| 1,899,511 | Leaf | Feb. 28, 1933 |